United States Patent Office 3,069,242
Patented Dec. 18, 1962

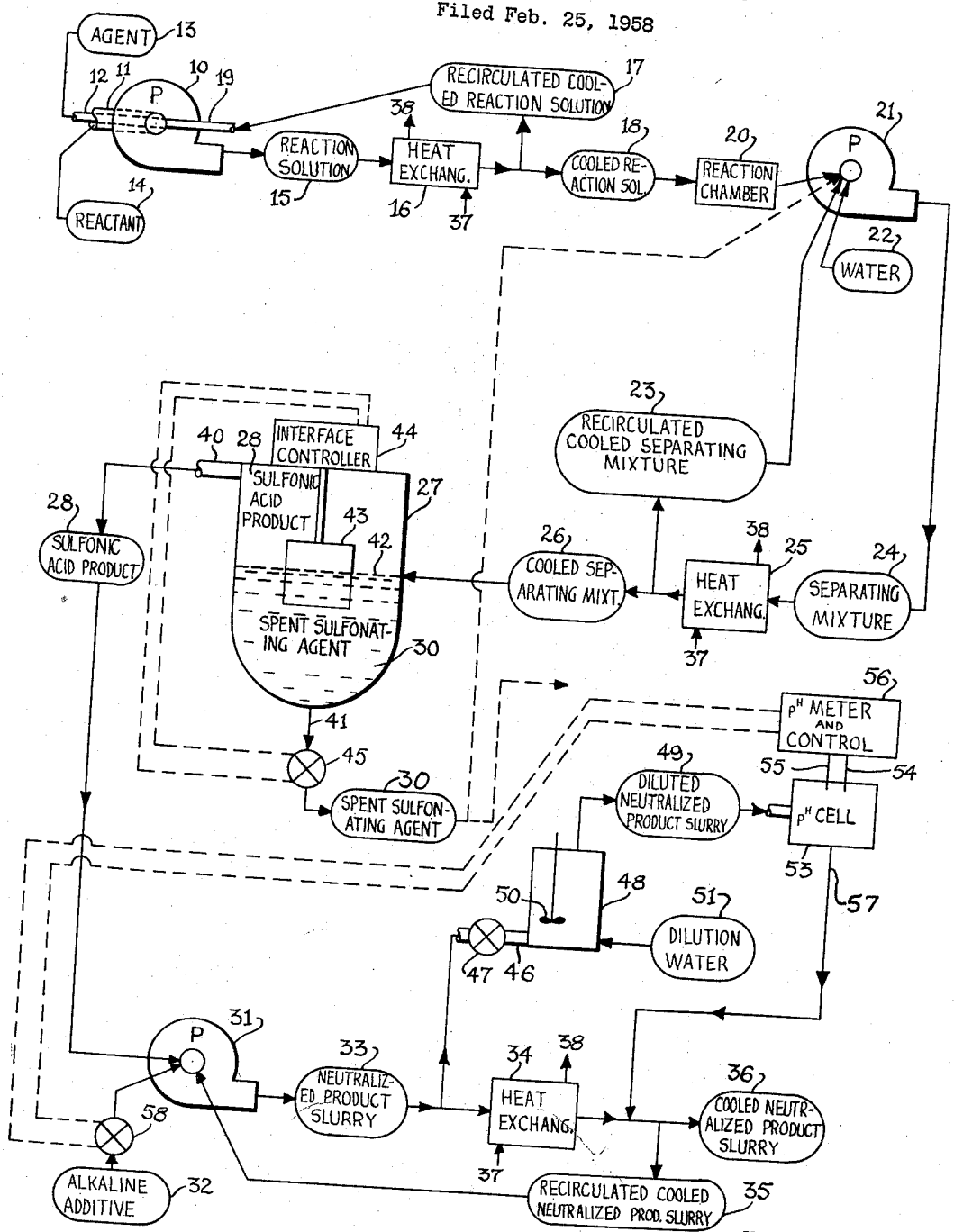

3,069,242
SULFONATION AND SULFATION APPARATUS
Richard J. Brooks and Burton Brooks, Seattle, Wash., assignors to The Chemithon Corporation, Seattle, Wash., a corporation of Washington
Filed Feb. 25, 1958, Ser. No. 717,358
7 Claims. (Cl. 23—260)

This invention relates to apparatus for sulfonating and/or sulfating a reactant and, more particularly, to an apparatus for continuously sulfonating and/or sulfating a reactant with an agent and for continuously separating the resulting sulfonated reactant from the excess agent, and for continuously neutralizing the resultant acids. This is a continuation-in-part of our application Serial No. 562,175, filing date of January 30, 1956, entitled "Continuous Sulfonation and Sulfation Apparatus," now abandoned.

The preparation of organic sulfonic acids and of organic sulfonates for use as detergents having many of the desirable properties of soap is well known in the art. The sulfonates as such find wide usage in the textile, leather, paper, glue, petroleum and other industries. Other examples illustrating the usage of the sulfonated derivatives are: the sulfonating product obtained from the sulfonating a phenol-aldehyde condensate is employed as an aid in leather treating; the alkali metal salts of sulfonated mineral oils are employed alone or in mixtures with fatty acid soaps as efficient surface active agents; certain sulfonation products obtained by sulfonating the higher molecular weight aromatic hydrocarbons and other compounds are employed in dyeing; and, certain sulfonated esters such as the esters of cetyl, stearyl, and palmityl alcohols are employed as detergents.

Most of the commercial sulfonation methods are based on the batch process. More explicitly, in a typical batch process for the sulfonation of a hydrocarbon such as an alkyl benzene having ten to fifteen carbon atoms in the alkyl side chain the sulfonating agent, twenty-two (22%) percent fuming sulfuric acid, is added to the hydrocarbon over a period of two hours. The sulfuric acid is added to the hydrocarbon in such a manner that the reaction temperature does not exceed 100° F.; and the weight ratio of the acid to the hydrocarbon (based on the weight of equivalent one hundred percent sulfuric acid per weight of hydrocarbon) is approximately 1.04:1. Next, the acid and hydrocarbon are agitated as by a circulating pump and the reaction permitted to take place for two hours. After the sulfonation step is completed sufficient water is added to the sulfonated hydrocarbon-sulfuric acid mixture to dilute the excess sulfuric acid to approximately eighty (80%) percent sulfuric acid in order to obtain more complete separation of the sulfuric acid from the sulfonated hydrocarbon. The temperature during the dilution step is limited to a maximum of 145° F. in order to minimize color degradation and also to limit the gel structure of the sulfonation mixture. After the dilution step is complete the aqueous sulfonation mix is left to settle into an upper layer comprising the sulfonated hydrocarbon and a lower layer comprising the excess sulfonating agent. This settling or separating of the acids takes a considerable period of time, viz., for a 2300 gallon batch approximately four hours settling is required to yield an 85/15 or better product (85 parts of the sodium salt of the sulfonated hydrocarbon and 15 parts of sodium sulfate, by weight). In order for the process of sulfonating a hydrocarbon and separating the sulfonated hydrocarbon from the excess sulfonating agent to be carried to completion there is necessitated approximately eight hours of time. In those instances where the acid product is neutralized with an alkaline reagent the neutralization step necessitates approximately three to four hours. Therefore, the total time for the sequence of process steps, sulfonation, separation and neutralization there is required about eleven to twelve hours. Even though the batch sulfonation process is widely employed there are certain inherent limitations which restrict the usefulness of the process, i.e., in order for a batch sulfonation apparatus to have a large output there is necessitated a large reaction vessel, a large settling or separating vessel, and a large neutralizing vessel. The large reaction vessel in turn requires a long addition time for the mixing of the sulfonating agent and the hydrocarbon, a long reaction time, and because of the large volume of the reactants the accompanying difficulty of controlling the temperature rise of the reaction mixture. This temperature rise accompanied with the long reaction time leads to the degradation of the sulfonated hydrocarbon. The large volume of the aqueous separating mixture and the temperature rise, due to the hydration of the unreacted sulfonating agent, make it difficult to control the temperature of the aqueous mixture. Again, the long settling time together with the temperaure of the settling mixture is conducive to the degradation of the sulfonated product.

In the past there have been attempts to manufacture equipment having a more or less continuous flow by permitting the batch tanks to continuously overflow from one tank to another tank. This apparatus did not increase the sulfonation or settling rates but only produced the product in a continuous manner. In other apparatus considerable use has been made of centrifugal pumps as mixing devices without decidedly increasing the reaction rates and the lowering of the residence time in the apparatus. It is considered that the failure of prior centrifugal pump apparatus in relation to the sulfonation step was the premixing of the reactants prior to their entry into the centrifugal pump instead of substantially simultaneous contacting and mixing the reactants in the pump. It should be noted that the prior art implies a large hold tank in the recycle system to bring about additional reaction time between the reactants. For example, see United States Letters Patent No. to Schmerling 2,524,086, and Stoneman, 2,613,218. The dilution of newly introduced reactants with a large volume of almost completely reacted reactants reduces the reaction rate of the freshly introduced reactants. This is a result of a dilution in the concentration of the reactants. This decrease in the concentration of the reactants by the product of reaction increases the time required for sulfonation with resultant degradation of the final product.

In the above cited prior art and in order to separate the sulfonic acid product and the sulfate products from the excess sulfonating agent such as sulfonic acid, the mixture is added to sufficient water to decrease the strength of the sulfuric acid to about eighty (80%) percent concentration. At this concentration and under these conditions the two phases, i.e., the product phase and the excess sulfuric acid phase, separate in about four hours. The reason for this slow separation is that the sulfuric acid phase is emulsified in the process so as to become a sulfuric acid emulsion in the product phase or sulfonic acid phase. The sulfonic acid phase is of a high viscosity. As a result an emulsion comprising sulfuric acid in the sulfonic acid possesses a high viscosity. Because of this high viscosity the separation of the emulsion into the product and the excess reactant requires a considerable period of time. Therefore, any factor that tends to decrease the viscosity also hastens or is conducive to the rate of separation of the excess reactant and the product. Examples of such a factor are a higher temperature with a corresponding decrease in the viscosity and the use of more dilute acids so as to decrease the viscosity. However, such techniques as the use of higher temperatures and the use of more dilute acids increase the corrosion rates of the product mixture on stainless steel. Coupled with these factors is the fact that even under these circumstances the separating time of the emulsion into the product and the excess reactant is not materially reduced below four hours. As a modification it has been noticed that there is some improvement in the four hour separating time by the introduction of the diluted mixed acids below the interface in the settling tank. The washing action of the sulfuric acid layer on the mixed acids improves the separating rate. It will be demonstrated by this invention that the most effective method for separating the sulfonic acid product from the excess sulfonating agent is the inversion of the emulsion comprising the sulfuric acid in the continuous sulfonic acid phase so that there results an emulsion comprising as the continuous phase sulfuric acid with the sulfonic acid dispersed therein. This latter emulsion is less viscous than the former emulsion. Because of this decrease in viscosity and resulting greater mobility of the reactant and the product the two separate into the sulfonic acid product phase and the sulfuric acid reactant phase in a matter of minutes instead of hours.

Apparatus which has been used in related fields but not necessarily in the sulfonation of an alkyl aromatic compound or in sulfation is disclosed by Pyzel, Patent No. 2,332,527, Reman et al., Patent No. 2,729,549 and Carlson et al., Patent No. 2,350,095.

Pyzel teaches of the mixing of the reactants by allowing the same to contact each other by flowing through a pipe or tube for a relatively long period of time so that mixing occurs by turbulence and convection currents in the pipe or tube so as to form a reaction mixture. Additional mixing is accomplished by means of orifices whereby the reaction mixture is flowed through orifices to more completely mix the reactants. Also, there is employed a time tank so as to allow the reactants to react for a relatively long period of time. Pyzel does not teach of the reaction between an alkyl benzene and a sulfonating agent, and also does not teach of the substantially instantaneous contacting and mixing of the same. However, if this apparatus were employed for such a reaction there would result a low conversion rate and a product of a relatively low quality. Reasons for this are the lack of good mixing of the reactants upon contact with each other and the relatively long period of time in which the reactants are in contact. As will be appreciated, the sulfonating agent upon being in the presence of the product reacts with the product to degrade the same and thereby lower its quality. Furthermore, Pyzel does not teach of a means for separating the product from the excess sulfonating agent.

Reman et al. teaches of a means for contacting liquids, the reacting of a liquid dispersion and the separating of the liquid dispersion into two or more phases. Reman et al. does not teach of the mixing and reacting of a sulfonating agent and an alkyl aromatic, the formation of a reaction mixture from the agent and the alkyl aromatic, and the separating of the reaction mixture into a product and excess sulfonating agent. Reman et al. does teach of the flowing of a dispersion comprising liquids into a separating chamber. The position of the interface between the two non-compatible liquids in the separating chamber is controlled by an interface regulator with the rag in the interface being bled off.

Carlson et al. teaches of the introduction of a waste pickle liquor and an alkaline material into a mixing means so that the liquid and the alkaline material are contacted and mixed at practically the same time. Carlson et al., does not teach of the sulfonation of an alkyl aromatic or the sulfation of organic compounds.

With these limitations and shortcomings of the batch sulfonation process in view and the large and bulky apparatus required to carry out the process, we have invented a continuous sulfonation apparatus which utilizes relatively small and compact equipment. Briefly, in order to carry out the sulfonation step we employ injection and mixing means which substantially instantaneously contacts and mixes a reactant and a sulfonation agent to produce a reaction solution. And, we also utilize a mixing means for mixing the sulfonation reaction with water and a partially separated aqueous solution with water and a partially separated aqueous reaction mixture having an inverted emulsion so as to allow the two phases to separate very rapidly and continuously. In our apparatus there is also a relatively small separating vessel through which the partially separated aqueous reaction solution continually flows and therein separates very rapidly into the spent sulfonating agent and the product.

In addition to being a sulfonation apparatus our equipment is also useful in part as a sulfation apparatus or for the tandem sulfonation and sulfation of various reactants. Actually, we have combined and operated conventional process equipment to continuously manufacture high active organic sulfonates and/or sulfates. The invention resides in the combination of these basic elements to produce improved products at a faster rate than previously accomplished by other means.

Another way of expressing this is that we have discovered that if two normally immiscible reactants are simultaneously and instantaneously contacted and thoroughly mixed in a system of relatively small volume the reaction rate is very rapid, and often true solutions are formed with certain concentrations of the sulfonating and/or sulfating agent. This thorough mixing permits the sulfonation reaction to take place in a matter of minutes instead of hours. The reaction mixture is permitted to react to completion in apparatus where channeling is prevented or maintained at a minimum. The temperature of the reaction mixture is controlled by heat regulating apparatus. In this apparatus channeling of the mixture is also kept at a minimum. Secondly, the separation of the excess sulfonating agent from the sulfonic acid product is rapid if there is formed an emulsion comprising as the continuous phase sulfuric acid and having the more viscous sulfonic acid dispersed therein. The reaction mixture, with the reaction substantially complete, is fed into a mixing means wherein it is mixed with water and previously diluted sulfonic acid in such a way as to invert the existing emulsion comprising as the continuous phase the sulfonic acid and to form the emulsion comprising as the continuous phase the sulfuric acid. Then the latter emulsion is fed into a separating chamber wherein it separates into the product and the excess separating agent. In those instances where it is desired to manufacture a detergent the product is mixed with an alkaline material such as sodium hydroxide or potassium hydroxide to form the sodium or potassium salt of the sulfonic acid. Employed are techniques and apparatus by which separation may be made in a few minutes instead of hours. The result is a process and apparatus which can be operated continuously, producing a superior product over those now known and which can be carried out in equipment smaller and considerably less expensive than any shown by the prior art for the same output capacity.

An object of this invention is the provision of apparatus for continuously sulfonating and/or sulfating a reactant with a sulfonating and/or sulfoating agent and for continuously separating the sulfonate from the excess sulfonating agent, and for continuously neutralizing the resulting acid product.

A further object is to provide apparatus to continuously produce a high-active sulfonate detergent having favorable color characteristics, said high-active sulfonate comprising about 90% active material on the dry basis.

Another object is to provide apparatus for continuously sulfonating and/or sulfating a reactant in a short reacting time commensurate with a substantially complete reaction.

An additional object is the provision of apparatus for carrying out a sulfonating process and which apparatus makes it possible to control the reaction temperature, reaction time, settling temperatures and settling time.

A further and important object is the provision of apparatus for continuously separating the excess sulfonating agent and the sulfonate in a reaction solution and which step requires a minimum of time.

A further object is the provision of apparatus for substantially simultaneously contacting and mixing reactants such as a hydrocarbon and a sulfonating agent so as to form a reaction mixture.

Another object is to provide apparatus having a relatively small volume for the reaction mixture but a high recirculation rate of said mixture.

An additional object is the provision of apparatus which substantially prevents channeling of the reaction mixture so that the degree of reaction is substantially always the same.

Another object is to provide apparatus which is capable of inverting an emulsion comprising sulfonic acid as a continuous phase with sulfuric acid therein to an emulsion comprising sulfuric acid as a continuous phase with sulfonic acid therein.

A further object is the provision of a low-cost sulfonating apparatus and which apparatus is economical to operate.

Various other and ancillary objects and advantages of the instant invention will become apparent from the following description and explanation of the present invention.

In the accompanying drawing:

The drawing illustrates the combination of elements for carrying out the continuous sulfonating and/or sulfating of a reactant, and the continuous separation of the sulfonic acid from the excess sulfonating agent, and the continuous neutralization of the acid to form the neutralized product.

An overall picture of our apparatus for sulfonating and/or sulfating a reactant reveals the same to comprise a first single-stage centrifugal pump 10 and into the suction side of which are smultaneously and separately fed through concentric tubes or pipes 11 and 12 a sulfonating agent 13 and a reactant 14. These tubes inside of the pump terminate a fraction of an inch from the impeller blades so that the sulfonating agent and the reactant are substantially simultaneously and instantaneously contacted and mixed into a reaction solution 15.

The concentric pipes enter the pump through the suction connection primarily because of simplicity of construction. It is also possible to admit the reactants on the periphery of the pump case, a fraction of an inch from the impeller, with equally good results. This means of introduction of the reactants is extremely important and forms a major deviation from the prior art. When this method of introducing the reactants is employed a stable homogeneous mixture or clear solution of the mixed acids results, allowing rapid and complete sulfonating of the organic material without degradation. In conventional practice, little attention has been given to this substantially simultaneous and instantaneous mixing of the reactants. Actually the reactants are allowed to leisurely intermix over a relatively long time period. It has been found that passing the reactants through a centrifugal pump after improper premixing does not produce the same results as introducing the agent and the reactant through concentric pipes. On the contrary, if the reactants have been improperly mixed prior to agitation in the pump, degradation and side reactions combine to form inferior products.

It is to be understood that the reactant may enter the pump through either pipe and that the agent may enter the pump through the other pipe.

From the centrifugal pump the reaction solution flows to a first heat exchanger 16 for extracting the heat of reaction. We have found from experience that it is beneficial to the reaction if the volume of the reaction solution is kept small. One manner of accomplishing this is to have the pump and the heat exchanger as close to each other as practical and therefore the pipe connecting them as short as practical. It is of advantage to use a shell and tube heat exchanger in which the coolant flows through the tubes and the reaction solution flows through the shell side.

Also, we prefer that the heat exchanger be of the counter-current type having a large number of small diameter tubes, i.e., tubes not larger than approximately one-half inch in internal diameter, as contrasted with a small number of relatively large diameter tubes. In certain instances small tubes are of value as they increase the heat transfer coefficient and decrease the volume. The reaction solution, upon leaving the heat exchanger, splits into a first fraction, recirculated cooled reaction solution 17, which is introduced through pipe 19 into the pump, either at the periphery or near the center, and recycled through the centrifugal pump 10 and a second fraction, cooled reaction solution 18, which flows to a reaction chamber 20. This second fraction is equal in volume to the volume of the feed comprising the agent and the reactant. The first fraction 17 is mixed with the agent 13 and the reactant 14 to form the reaction solution 15, and serves the function of absorbing some of the heat of reaction from the solution. As we have achieved the best results with a relatively small volume of recycled solution 17, it is advisable to maintain the volume of this first fraction as small as possible commensurate with its function. The average length of time the reaction solution is in the first single-stage centrifugal pump 10 and the accompanying heat exchanger circuit is from two to three (2 to 3) minutes. The reaction chamber 20 is designed so that the reaction solution passes therethrough in from four to ten (4 to 10) minutes depending upon the reactants, the reaction, the temperature, and the sulfonating agent. It is emphasized that the success of the reaction chamber is dependent upon the formation of a stable mixture or solution in the pump 10 in order that the reaction will proceed without additional agitation. The reaction chamber is relatively small in cross section, i.e., in transverse dimension compared to its length, i.e., in longitudinal dimension. The reaction solution flows through this pipe with only a minimum of channelling or back mixing so as to produce a relatively uniform product. The chamber may be of glass or stainless steel. From the reaction chamber the reaction solution passes to a second centrifugal pump 21 where it is mixed with water 22 and a recycling stream 23, recirculated cooled separating mixture, to form a separating mixture 24. This separating mixture 24 is an emulsion comprising as a continuous phase sulfuric acid and having dispersed therein sulfonic acid. The separating mixture upon leaving the pump 21 flows to a second heat exchanger 25 where the heat of dilution of the sulfonating agent with water is removed. Upon leaving this second heat exchanger the separating mixture 24 splits into two fractions, the previously mentioned first fraction 23 which is recirculated through the second centrifugal pump 21 wherein and with the added water 22 causes the inversion of the emulsion, and a second fraction 26, cooled separating mixture, which flows to a separating chamber settling tank 27. This second fraction 26 is substantially equal in volume to the volume of the reaction solution 18 and water flowing into the second centrifugal pump 21. It is this technique of recirculating or mixing the undiluted incoming reaction solution 18 with the recycling stream 23 which perpetuates the rapid separation of the sulfonic acid product and the excess sulfonating agent. In this separating chamber the velocity of the diluted partially separated solution is decreased so that it takes from eight to fifteen (8 to 15) minutes for the solution to pass through the chamber. During this time, the partially separated mixture separates into an upper layer comprising the sulfonic acid product 28 and a lower layer comprising the spent sulfonating agent 30. At this time it is appropriate to clearly bring forth that this technique achieves separating and settling rates varying from fifteen to twenty-five (15 to 25) times faster than such rates in the prior art.

At this time it is appropriate to state that upon starting up the plant that some of the excess sulfonating agent 30 can be recycled with reaction solution 18 and water 22 through the second centrifugal pump 21 to form the separating mixture 24.

In instances where it is desirable to make a detergent, the sulfonic acid product 28 flows to a third centrifugal pump 31 where it is mixed with fifteen (15%) percent aqueous sodium hydroxide solution 32, or other basic solutions, to neutralize the sulfonic acid and to make a neutralized product slurry 33. From the third centrifugal pump the neutralized product slurry flows to a third heat exchanger 34 where the heat of neutralization is removed. The neutralized product slurry, upon leaving this heat exchanger, splits into a first fraction 35, recirculated cooled neutralized product slurry, which is recirculated through the third centrifugal pump 31 and a second fraction 36 which is the cooled neutralized slurry product. The first fraction 35 upon being agitated and mixed with the sulfonic acid product 28 and the sodium hydroxide 32 functions to absorb some of the heat of the neutralization reaction. With reference to the heat exchangers the entering coolant, normally water, is referred to by 37 and the exiting water by 38. As is appreciated from the above detailed description of our reaction it is seen that a reactant such as alkyl benzene is continuously sulfonated and is continuously separated from the excess sulfonating agent in a time period of less than one-half hour. In some cases the resulting sulfonic acid product is also neutralized to make the product 36 in this time period of about one-half hour. From this the advantage of the increased rate of operation of this apparatus is readily apparent when it is considered that in previously used batch apparatus there was required approximately eleven to twelve hours to accomplish the same operations.

In the sulfonation process there are a number of critical points which must be closely regulated in order to secure a high quality sulfonic acid which contains a low percentage of unsulfonated oil, and also which is not carbonized and degraded. To be more explicit, these critical points are in the mixing of the sulfonating agent and the reactant; the percentage of the recycled solution in the reaction solution; the apparatus in which the reaction solution 15 is digested; the degree of separation of the product and the excess sulfonating agent from each other; the reaction time; the sulfonating or sulfating agent; the ratio of the sulfonating or sulfating agent to the reactant; the temperature of the reaction solution; and, the time required for the product to separate from the excess sulfonating agent. Turning now to the reaction, there are a number of suitable sulfonating agents for use in the sulfonation and/or sulfation processes. The better known of these are fuming sulfuric acid, sulfur trioxide, chlorosulfonic acid, and concentrated sulfuric acid. Of the many fuming sulfuric acids available, the 22% fuming sulfuric acid gives good results. In those instances where a substantially 100% high-active detergent is desired or where the disposal of spent sulfuric acid presents a problem, the use of sulfur trioxide is desirable and beneficial as a large percentage of the same reacts and after neutralization with sodium hydroxide introduces only a minimum amount of sodium sulfate into the detergent, normally about two (2%) percent. A desirable sulfur trioxide is obtainable from the General Chemical Co. under the trademark "Sulfan," a stabilized sulfur trioxide. Another well-known and frequently used sulfating agent is chlorosulfonic acid. And, concentrated sulfuric acid, such as 100% or 98% sulfuric acid, is frequently employed as the sulfating agent, especially where the reaction cannot be too vigorous as there exists the possibility of undesirable side reactions and degradation.

In carrying out our continuous sulfonation process one of the main steps is the thorough mixing of the sulfonating agent and the reactant undergoing sulfonation, and removal of the heat of reaction. This mixing should be such that very small drops of the sulfonating agent and the reactant are interspersed to form the reaction solution. Also, the mixing should be practically instantaneous in order to achieve the best results. As previously emphasized, the formation of the reaction solution is realized by separately feeding the sulfonating agent and the reactant through concentric pipes into the suction side of the centrifugal pump, or through the pump case near the circumference, with the pipes terminating only a fraction of an inch from the pump blades. Also, some of the reaction solution which has passed through the first heat exchanger is recirculated through the pump. The particular centrifugal pump we employ is rated at a capacity of 75 gallons per minute at a 75 foot head, and possesses a nine inch impeller. In this mixing step it is necessary to operate the pump in excess of 900 r.p.m. to insure the formation of the reaction solution. Exemplary of the liquid reaction solutions formed is the one comprising an alkyl benzene having twelve to eighteen carbon atoms in the side chain and twenty-two (22%) percent fuming sulfuric acid. Although the alkyl benzene is a white liquid the resulting transparent reaction solution possesses a color varying from light amber to cherry red and upon standing a week at room temperature is stable. Herewith it is to be called to attention that the effectiveness of the mixing operation of the reactancts is shown by the appearance of the reaction solution or the mixed reactants. In most batch operations, where mixing is carried forth in agitated tanks or where pre-mixing takes place before passing through a high-speed mixer or centrifugal pump, a dark reaction solution is formed having a slow reaction rate and resulting in a degraded product. As is readily appreciated, the formation of the reaction solution 15 eliminates local overheating thereby making a more uniform and better quality product. To be more explicit, in the sulfonation of an alkyl benzene with the absence of local overheating and high acid concentrations there is less product degradation.

The temperature of the reaction and the time of the reaction are closely interrelated as generally the higher the temperature the shorter the reaction time. One of the ways for regulating the temperature of the reaction solution is to recycle a volume of the reaction solution after it has passed through the reaction heat exchanger. This recycled reaction solution flows through the reaction mixer along with the sulfonating agent and the reactant, and functions as a heat sink or an absorber of the heat of reaction. The ratio of recycled reaction solution to feed may vary over a wide range. It is desirable if the minimum ratio of recycled solution to the reactant feed be not less than fifteen to one (15:1). Normally, the temperatures of the reactants are of secondary important although for ease of handling their temperatures should be sufficiently high to insure that they will be in the fluid state, either a liquid or a gas. For example, in the sulfonation of an alkyl benzene with twenty-two (22%) percent fuming sulfuric acid the alkyl benzene should be in the liquid state and the temperature of the sulfuric acid should be in the range above the freezing point of the acid. Immediately upon forming the reaction solution comprising the sulfonating agent and the reactant undergoing sulfonation the temperature of the solution is adjusted to a value in the range of 90–130° F. by extracting some of the heat of the reaction. The reaction is allowed to proceed for a sufficiently long period of time to insure a substantially 100% conversion of the material undergoing sulfonation to a sulfonic acid and/or a sulfate. This period of time is normally from four to ten minutes at the indicated temperatures. By so regulating the reaction temperature and the time of reaction it is possible to produce a better quality product as there are less harmful side reactions taking place with resulting product degradation.

One of the main advances of our apparatus is the relatively small volume of the sulfonation heat exchanger and recycle system. Although our apparatus has the capacity for holding only a small volume of the reaction solution a high recycle rate is provided. Even though a small volume is beneficial during the sulfonation stage we have found that in the subsequent steps, i.e., the mixing of the reaction solution with the recycling stream 23 and water and in the neutralization step, that the volumes of the solutions can be of any proportions.

Another very important step in the sulfonation process is the mixing of the reaction solution with water and recycling stream 23 to invert the emulsion comprising as the continuous phase sulfonic acid with sulfuric acid dispersed therein to an emulsion comprising sulfuric acid as the continuous phase with sulfonic acid dispersed therein. The dilution of the sulfonating agent with the water lessens the reaction rate, with the release of a considerable quantity of heat, the heat of dilution. Even though the excess sulfonating agent is reduced in concentration and effectiveness, nevertheless at an elevated temperature it is still capable of adversely acting upon the sulfonic acid. Therefore, the heat of dilution in the aqueous reaction mixture is removed and the temperature adjusted to a value in the range of 115–140° F. by recycling the same through a heat exchanger.

The diluted reaction mixture, it is hypothesized, normally forms an emulsion having as a continuous phase the sulfonic acid product and dispersed therein the excess sulfonating agent. This emulsion is viscous and, upon standing, slowly separates into the sulfonic acid product and into the excess sulfonating agent. It may take as long as ten to twelve hours for the emulsion to separate into the product and the excess sulfonating agent. For this reason it has been necessary in prior processes, be they batch or continuous, to have a large separating tank so that there is sufficient time for the separation step to go to completion.

The addition of water to the reaction solution, within certain well-defined ranges, and the agitation thereof to form an inverted emulsion considerably alters the separation time of the product and the excess sulfonating agent. More particularly in the sulfonation of dodecyl benzene, if the volume of the excess sulfonating agent is at least about twenty-two (22%) percent by volume of less than eighty-six (86%) percent strength sulfuric acid and the resultant mixture agitated properly, there is formed an inverted emulsion. This inverted emulsion comprises a continuous phase of the excess sulfonating agent and has dispersed therein droplets of the product. The inverted emulsion, in comparison with the emulsion comprising the product as the continuous phase with excess sulfonating agent dispersed therein, is of a relatively low viscosity. Therefore, this inverted emulsion rapidly separates into the product and the excess sulfonating agent. In fact, the separation is so rapid that the inverted emulsion can be continuously flowed into a tank or chamber and the separation is substantially complete in a period of from eight to fifteen minutes.

There are several methods for initiating and maintaining rapid separation of the diluted reaction mixture of dodecyl benzene sulfonate and sulfuric acid. One of these comprises the mixing of the reaction solution with water in the dilution mixer to form an aqueous reaction mixture. A substantial sample of the aqueous reaction solution is withdrawn from the system and allowed to stand without agitation for a period of ten to fifteen minutes. Upon standing, the emulsion begins to separate into larger drops of the product and the excess sulfonating agent. This mixture of the product and the sulfonating agent is then re-introduced into the dilution recirculation mixer along with the water and the reaction solution. As long as the volume of the excess sulfonating agent, expressed as less than eighty-six (86%) percent strength sulfuric acid, is maintained at a minimum of about twenty-six (26%) percent by volume in the dilution mixture, there is formed the inverted emulsion with sulfuric acid as the continuous phase.

In another method for inducing rapid separation of the product and the excess sulfonating agent it is assumed that the reaction solution and water have been mixed in the dilution mixer, and the system is full. The plant is then shut down for approximately a period of ten to fifteen minutes. As is realized the emulsion begins to separate into the product and the excess sulfonating agent. Upon starting the plant and recirculating the partially separated mixture, and as long as the minimum volume of the excess sulfonating agent, expressed as less than eighty-six (86%) percent strength sulfuric acid, in the dilution mixture, is maintained at least twenty-six (26%) percent by volume, there is formed the inverted emulsion.

Another method for initiating and maintaining this rapid separation is to recycle some of the spent sulfonating agent, which has been previously separated from the product, into the dilution mixer 21 along with the water and reaction solution. A sufficient quantity of the spent sulfonating agent should be recycled so as to build-up the concentration of the same to at least a minimum value of thirty-five (35%) percent by volume expressed as less than eighty-six (86%) percent strength sulfuric acid in the dilution mixer to initiate the inversion to the continuous sulfuric acid phase, and once inversion has been accomplished, maintained at a minimum of about twenty-two (22%) percent by volume. This minimum concentration insures that once the step of inverting the emulsion has started this inversion will continue.

Still another method for inducing and maintaining the separation of the product and the excess sulfonating agent is to insure a sufficiently high ratio of sulfonating agent to alkyl aryl reactant so as to form an emulsion comprising the excess sulfonating agent as the continuous phase and the product as the discontinuous phase. More particularly, initiating of the inversion step can be brought about if the minimum volume of the excess sulfonating agent expressed as less than eighty-six (86%) percent strength sulfuric acid is at least thirty-five (35%) percent by volume. And, the maintaining of the inverted emulsion can be realized if the excess sulfonating agent in the dilution step is at least twenty-two (22%) percent by volume, expressed as less than eighty-six (86%) percent strength sulfuric acid.

The dilution mixer 21 must possess the characteristics of being able to thoroughly mix the reaction solution with water and the partially separated and inverted aqueous reaction emulsion to form a separating mixture. The mixer most appropriate for this step is a centrifugal pump. To be more specific we employ a single-stage centrifugal pump having a nine inch impeller and a 75 gallon per minute capacity with a 75 foot head, a product of the Worthington Pump Co., as our dilution mixer. In order to secure the best separation with the centrifugal pump we have found that the same should not be operated at excessively high speeds, but must provide good recirculation or recycling rates. With this operating limitation in view we have achieved with this centrifugal pump the best separation at 900 r.p.m., very good separation at 1200 r.p.m., and good separation at 1750 r.p.m. If the pump is operated with a stuffing box sufficient back pressure must be placed on the system to prevent leakage of air into the system. Sufficient water should be added in the operation to dilute the excess sulfuric acid to a value in the range of seventy-eight to eighty-two (78–82%) percent. As the amount of water is increased, the settling rate also increases. However, the acid also becomes more corrosive below this concentration range so that dilution beyond this point is undesirable. In this range of concentration the acid separates very rapidly.

The diluted partially separated mixed acids are permitted to separate into the first component comprising the acid product and into the second component comprising the excess sulfonating agent by flowing the diluted mixed acids slowly through the separating vessel or settling tank 27. The flow rate is such that the aqueous mixture is in the vessel for a time of about eight to fifteen minutes. The particular separating vessel we employ is a vertical cylindrical chamber having an inlet approximately midway between the bottom and the top. At the upper end there is an outlet pipe 40 for the acid product and in the bottom there is another outlet pipe 41 for the spent sulfonating agent, generally about eighty (80%) percent sulfuric acid. In the separating vessel the partially separated aqueous reaction solution continuously separates into the two components with the lighter product 28 floating on the heavier spent sulfonating agent 30. The level of the interface 42 between these two components is maintained within a close range by an interface controller comprising a float 43, an interface regulator 44, and a valve 45 in the spent sulfonating agent outlet line. If the level of the interface in the vessel becomes too high the float rises and the interface regulator causes the valve to open wider allowing more spent sulfonating agent to flow out of the vessel. Conversely, if the interface drops below the set point, the interface regulator causes the valve to partially close thereby restricting the flow of the spent sulfonating agent out of the vessel. Since the interface is maintained at a constant level, and the flow to the closed tank is constant, the sulfonic acid continuously overflows to the neutralizing system at a substantially constant rate.

In the manufacture of synthetic detergent the sulfonic acid is mixed with a fifteen (15%) percent sodium hydroxide solution. In our apparatus this mixing of the caustic and the acid is carried out with a Worthington pump having a rated capacity of 75 gallons per minute at a 75 foot head with a 9 inch impeller. The pump is run at 1750 r.p.m. It is necessary to extract a large amount of the heat developed upon neutralizing the acid with the base. Therefore, the neutralized detergent slurry is recycled through a heat exchanger to maintain the proper temperature in the range of 90–120° F. and, preferably, 100° F. This recycled and cooled neutralized product functions to dilute the heat of reaction. This neutralized sulfonate slurry, pH of about 9–10.5, is then further treated to make the detergent product.

In controlling pH in a continuous flow system a smooth pH control is relatively difficult to realize. When employing strong bases such as sodium hydroxide or potassium hydroxide, at a concentration in the ranges of 15 to 50 percent, a small variation in the quantity of the base relative to the acid to be neutralized causes a relatively large pH oscillation in the neutralized product. In our system we neutralize the sulfonic acid with a strong aqueous caustic slurry in the range of 15 to 50 percent sodium hydroxide or potassium hydroxide. To further complicate the neutralization of the sulfonic acid, we try to realize a product having an approximate pH 7, i.e., a neutral product. As is appreciated with a neutral product, a small variation in the ratio of alkaline neutralizer to sulfonic acid causes a relatively large change in the pH of the product. In other words, in trying to realize a neutral product we are working on the steep part of the pH curve, which means that the ratio of the alkaline neutralizer to the sulfonic acid must be closely maintained.

The neutralized product slurry 33 approaches a 50 percent solids content. In this solids content range the pH measuring means, especially the glass electrodes, are not sensitive to the pH of the material being measured. In order to accurately measure the pH, we bleed off through pipe 46 some of the neutralized product slurry and introduce the same into mixing cell 48. In the pipe 46 is a valve 47 for regulating the amount of bleed off slurry. In the mixing cell is a stirrer 50 for mixing the neutralized product 33 with dilution water 51 to form an aqueous neutralized product having approximately 25 percent solids concentration, i.e., the neutralized sulfonic acid. From the mixing cell, the slurry 49 is fed through pipe 52 into pH measuring cell 53. In this cell are two pH electrodes connected with a pH control meter 56. The pH control meter 56 regulates a valve 58 which controls the amount of alkaline neutralizer 32 being fed into neutralizer pump 31. From the pH cell 53, the aqueous slurry flows through pipe 57 into cooled neutralized products slurry 36.

As is appreciated from this system, it is seen that a relatively small amount of product can be withdrawn and mixed with water to form an aqueous slurry having a lower concentration of solids. It is seen that the mixing cell acts as a surge tank so as to even out the flow of the neutralized product therethrough and thereby prevent relatively wide swings in the pH of the neutralized product from appearing in the pH meter. If this variation in the pH of the neutralized product were allowed to appear in the pH meter and control the valve 58 would be continually opening and closing so as to vary the caustic fed to the pump 31 and to produce, in turn, a variation in the pH of the product.

A number of heat exchangers are utilized in the carrying out of the process. These heat-exchangers may be of standard type. The particular type we employ is a reverse-flow type of heat exchanger having small tubes with the stock on the shell side.

The sulfonation reaction chamber may take a number of different forms such as a closely baffled vertical vessel or tube through which the reaction solution passes. In our own particular apparatus we employ a coil six (6") inches in diameter and many feet long with the length required being determined by the size of the incoming stream of reactants. Such a reaction vessel keeps channeling and back mixing to a minimum. As previously stated the reaction time in our process is normally from four to ten minutes.

As corrosive chemicals are being handled, it is of primary importance that the materials of construction be able to withstand the action of these chemicals and three appropriate materials are 316 stainless steel, Carpenter alloy 20, and glass. Of these we prefer the Carpenter 20 and the 316 stainless steel as they are not so prone to breakage and can be more readily fabricated than glass. In regard to corrosion, the sulfonating agent is diluted with water to form about eighty (80%) sulfuric acid. Such an acid is not as corrosive acting on the apparatus as a weaker acid and yet separates from the product.

Having presented a general picture of our sulfonation process and the apparatus for carrying out the same we will now present three specific examples for sulfonating a reactant and for separating the resulting sulfonation reaction emulsion into the sulfonated reactant and the excess sulfonating agent. However, it is to be understood that these examples are by way of illustration only and are not to be taken as limitations on the process.

EXAMPLE I

In this particular instance we sulfonated a hydrocarbon comprising in the main an alkyl aryl hydrocarbon, more particularly, alkyl benzene with the alkyl group having twelve to fifteen carbon atoms. A typical analysis of this alkyl aryl hydrocarbon is:

| | |
|---|---|
| Gravity, API (ASTM D 287) | 29.5–31.0. |
| Viscosity at 100° F. SU (ASTM D 88) | 44–50. |
| Color, Saybolt (ASTM D 156) | 19 minimum. |
| Bromine number (SM–15–13) | 0.5 maximum. |
| Aniline point, F (ASTM D 611) | 46–56. |
| Sediment and water (ASTM D 96) | Nil. |
| Appearance | Bright and clear at 70° F. |
| Distillation, ° F. (ASTM D 447): | |
| 5% recovered | 530–535. |
| 95% recovered | 560–565° F. |
| Doctor test (FS–5203) | Negative. |

*Additional Typical Tests*

| | |
|---|---|
| Molecular weight | (approx. 246) |
| Specific gravity 60/60 | 0.877 |
| Flash point (Pensky Martin), ° F | 255–260 |
| ASTM Distillation (D 447), ° F.: | |
| Start | 512 |
| 5 | 533 |
| 10 | 535 |
| 30 | 540 |
| 50 | 545 |
| 70 | 551 |
| 90 | 558 |
| 95 | 563 |
| End point | 570 |

We introduce 3.5 lbs./min. of this alkyl benzene and 4.2 lbs./min. of 22% fuming sulfuic acid into the first centrifugal pump to make a reaction solution of the same. The reactants are injected through concentric pipes into the suction side of the pump which is operating at a speed of 1750 r.p.m. The temperature of the reactants is room temperature, and at this temperature both of the reactants are liquids. In addition to introducing the sulfuric acid and the hydrocarbon into the pump we simultaneously recycle a partially reacted solution into the pump in order to instantaneously dilute the heat of reaction.

The reaction solution, upon leaving the pump, passes the first heat exchanger where the temperature of the solution is regulated to a value in the range of 120° F.

Upon being cooled to the desired temperature, the reaction solution is split into two fractions, a first fraction which is recirculated through the first centrifugal pump along with the reactants in a manner previously explained, and the second fraction which passes through the reaction chamber. In the recycling step the rate of flow of the recycled reaction solution compared to the volume of entering reactants was approximately twenty-five to one (25:1). The residence or digestion time of the solution in the reaction chamber is from four to ten minutes, and the time in the mixing circuit should not exceed three minutes.

The reaction solution, upon leaving the reaction chamber, is substantially reacted and the reaction is stopped by mixing the solution with about 0.77 lb./min. of water. The solution and water are mixed by introducing the same into the second centrifugal pump of the same capacity as the first centrifugal pump. The ratio of water to the hydrocarbon reactant is about 0.22 pound of water per pound of hydrocarbon, and the pump speed is in the range of 1400–1750 r.p.m. Rapid separation is initiated, as soon as this second system is full, by stopping the entire apparatus for approximately ten minutes so as to permit small drops of each phase to form, or the same result can be accomplished by recycling for a few minutes some 75–86% sulfuric acid from the bottom of the settling tank into the dilution mixture. The partially separated aqueous reaction mixture, consisting of an emulsion in which the sulfuric acid forms the continuous phase, with droplets of sulfonic acid therein is passed through the second heat exchanger to regulate the temperature of the same to a value of approximately 120° F., and upon leaving the heat exchanger the aqueous mixture is split into the first fraction and into a second fraction. The first fraction is recirculated through the second centrifugal mixing pump along with the fresh reaction solution and the water. In this regard the ratio of the recycled mixture to the water and the fresh reaction solution may vary over a wide range as long as there is sufficient quantity to remove the heat of dilution and to insure the thorough washing of the solution to form droplets of each phase. In this particular instance the rate of flow of the recycled sulfuric acid layer compared to the volume of fresh reaction solution was approximately twenty-five to one (25:1). The second fraction runs into the separating chamber wherein it separates into sulfonic and sulfuric acid layers. The residence time in the separating chamber is about ten minutes. The second component comprises substantially entirely eighty (80%) percent sulfuric acid, and the first component comprises approximately eighty-eight to ninety (88–90%) percent sulfonic acid with the balance water and sulfuric acid.

The sulfonic acid component is next mixed in the third centrifugal pump of the same capacity as the first and second pumps with a fourteen and one-half (14.5%) percent sodium hydroxide solution to make a slurry having a pH in the range of 10–10.5. The slurry is passed through a heat exchanger to regulate the temperature to a value of approximately 110° F. Upon leaving the heat exchanger, the slurry is split into a first fraction which is recirculated through the pump along with the caustic solution and fresh sulfonic acid and into a second fraction which is further treated to give a detergent having a pH of about 7.

The resulting detergent is of the following approximate composition:

| Component: | Percent by weight |
|---|---|
| Sodium alkyl aryl sulfonate | 40 |
| Unreacted alkyl benzene | 0.2 |
| Sodium sulfate | 6.5 |
| Water | 49.9 |
| Color (Tristiulus) | 3.4 |
| | 100.0 |

The sulfonation reaction is so nearly a 100% reaction that there is only a minimum of unreacted hydrocarbon in the detergent. As is well-known, one of the main uses of a detergent is in the role of a cleaning agent.

EXAMPLE II

As an example of a sulfation reaction in which digestion, dilution, and settling are not employed, a mixture of the methyl esters of oleic acid, palmitic acid, and stearic acid are sulfated in the same apparatus as employed for the sulfonation of the alkyl benzene in Example No. I. This mixture comprises, by weight, approximately one-half oleic acid and the other one-half being palmitic and stearic acids. Of these esters only the methyl oleate is unsaturated and therefore in this step only the methyl ester of oleic acid is sulfated.

In carrying out this sulfation four (4) pounds per minute of the ester mixture and one and four-tenths pounds per minute of ninety-eighty (98%) percent sulfuric acid are introduced through concentric pipes into the pump so as not to have premixing of the reactants. Both the acid and the ester mixture are at room temperature and therefore are liquids so as to be readily introduced into the pump. The pump is operated at a speed of 1750 r.p.m. insuring the formation of the reaction solution.

The reaction solution is passed through the heat exchanger to regulate the temperature of the solution to a value in the range of 90–130° F. and preferably 120° F. Upon leaving the heat exchanger, the solution is split into a first stream and a second stream. The first stream is recycled through the first centrifugal pump along with the mixture of esters and the sulfuric acid and thereby again formed into the reaction solution. Because the reaction is reversible the second stream flows directly to the second centrifugal pump operating at 1750 r.p.m. where it is mixed with about six (6) pounds per minute of sixteen (16%) percent solution of sodium hydroxide. The product has a pH of three to five (3–5), and contains approximately seven and three-tenths (7.3%) percent sulfur trioxide combined with methyl oleate, eighteen (18%) percent water, and the balance the methyl esters of palmitic and stearic acids. These sulfated oils are employed as anti-foaming agents.

EXAMPLE III

We introduced three (3) pounds per minute of pentadecyl benzene having an average of fifteen (15) carbon atoms in the side chain and three and six-tenths (3.6) pounds per minute of twenty-two (22%) percent fuming sulfuric acid into the first centrifugal pump to make a reaction solution of the same. The reactants were injected through concentric pipes into the suction side of the pump which was operating at a speed of 1750 r.p.m. The temperature of the reactants was room temperature, and at this temperature both of the reactants were liquids. In addition to introducing the sulfuric acid and the hydrocarbon into the pump we simultaneously recycled a partially reacted solution into the pump in order to remove the heat of reaction.

The reaction solution, upon leaving the pump, passed the first heat exchanger where the temperature of the solution was regulated to a value in the range of 120° F. Upon being cooled to the desired temperature, the reaction solution was split into two fractions, a first fraction which was recirculated through the first centrifugal pump along with the reactants in a manner previously explained and the second fraction which passed through the reaction chamber. In this instance the rate of flow of the recycled reaction solution compared to the volume of fresh reactants entering the system was about twenty to one (20:1). The residence time of the solution in the reaction chamber was seven minutes, and the time in the mixing circuit did not exceed three minutes.

The reaction solution, upon leaving the reaction chamber, was substantially reacted and the reaction was stopped by mixing the solution with about sixty-six hundredths pounds per minute of water. The solution and water were mixed by introducing the same into the second centrifugal pump of the same capacity as the first centrifugal pump. The ratio of water to the hydrocarbon reactant was about twenty-two hundreds (0.22 lb.) pounds of water per pound of hydrocarbon, and the pump speed was in the range of 1400–1750 r.p.m. Rapid separation was initiated, as soon as this second system was full, by stopping the entire apparatus for approximately ten minutes so as to permit small drops of each phase to form. As the phase inversion was once initiated it continued because of the high concentration of the sulfuric acid present in the mixture. The partially separated aqueous reaction mixture, consisting of an emulsion in which the sulfuric acid formed the continuous phase, with droplets of sulfonic acid therein, was passed through the second heat exchanger to regulate the temperature of the same to a value of approximately 120° F., and upon leaving the heat exchanger the mixture was split into a first fraction and into a second fraction. The first fraction was recirculated through the centrifugal mixing pump along with fresh reaction solution and the water. In this regard the ratio of the recycled mixture to the water and the fresh reaction solution varied over a wide range as long as there was a sufficient quantity to remove the heat of dilution and to insure the thorough washing of the solution. The second fraction flowed into the separating chamber wherein it separated into sulfonic and sulfuric acid layers. The residence time in the separating chamber was about ten minutes. The second component comprised substantially entirely eighty (80%) percent sulfuric acid, and the first component comprised approximately eighty-eight to ninety (88–90%) percent sulfonic acid with the balance water and sulfuric acid.

The first sulfonic acid component was next mixed in the third centrifugal pump and a fourteen and one-half (14.5%) percent sodium hydroxide solution as in Example I.

The resulting detergent was of the following composition:

| Component: | Percent by weight |
|---|---|
| Sodium alkyl aryl sulfonate | 40 |
| Unreacted alkyl benzene | 0.2 |
| Sodium sulfate | 6.5 |
| Water | 53.3 |
| | 100.0 |

Color (Tristiulus) _____ 5–7

The sulfonation reaction was so nearly a 100% reaction that there was only a minimum of unreacted hydrocarbon in the detergent. As is well-known, one of the main uses of a detergent is in the role of a cleaning agent.

The digester is employed to allow sufficient reaction time for the manufacture of the sulfonic acid. For example, in a plant manufacturing twenty million pounds of product each year there may be a coil having a six inch diameter and one-hundred and fifty feet in length. For a smaller plant manufacturing approximately five million pounds of product each year the coil may be six inches in diamter and thirty-five feet long. It is to be realized that the longer the coil the higher the flow velocity of the reaction solution. In actual construction the coil flows back upon itself so as to appear in a plan or elevational view like an accordion. The coil may be horizontal, thereby having the advantage that the reaction solution cannot spyhon itself out of the coil. Or, the coil may be vertical, thereby having the advantage that stratification of the reaction solution does not take place. For example, if the coil is of an excessively large diameter stratification of the reactants occurs whereby one strata of the solution may be at one temperature and another strata of solution may be at a different temperature. For example, this can occur in a coil of approximately eight inches or larger in diameter. For a smaller coil it is possible to lessen and/or eliminate stratification. In this regard resort may be had to a coil four inches in diameter. With such a coil stratification does not readily occur.

In the neutralization step whereby the sulfonated acid product is neutralized with a caustic the example gives the use of a fourteen and one-half (14.5%) percent aqueous sodium hydroxide solution. It is possible to employ a more concentrated sodium hydroxide solution such as a twenty-two (22%) percent aqueous solution. This lessens the amount of drying required for removing undesirable water.

Although the drawing has been presented without illustrating the different pipes and tubes it is to be appreciated that suitable piping is employed.

The advantage of the invention, it is thought, will have been clearly understood from the foregoing detailed description. Minor changes will suggest themselves and may be resorted to without departing from the spirit of the invention, wherefore it is our intention that no limitations be implied and that the hereto annexed claims be given a scope fully commensurate with the broadest interpretation to which the employed language admits.

In the claims:

1. An apparatus for reacting a reactant with a sulfonating agent, said apparatus comprising a first centrifugal pump having an impeller, means to introduce the reactant and the agent separately but substantially at the same place in the pump to form a reaction solution, said place being substantially in the path of travel of the impeller, a first heat exchanger, means for flowing the reaction solution to the first heat exchanger, means to split the reaction solution upon leaving the first heat exchanger, into a first fraction and a second fraction, means to reintroduce the first fraction into the first centrifugal pump, a digestion chamber having a relatively small cross-sectional area in proportion to its length, means to flow the second fraction into the digestion chamber, a second centrifugal pump, means to introduce the second fraction upon leaving the digestion chamber into the second centrifugal pump, means to introduce a first aqueous medium into the second centrifugal pump to form a first emulsion out of the second fraction and the aqueous medium, said emulsion comprising as a continuous phase excess agent and as a discontinuous phase a product of the reaction between the agent and the reactant, a second heat exchanger, means to flow said emulsion through said second heat exchanger, a settling tank, means to flow the emulsion from the second heat exchanger to the settling tank wherein the emulsion separates into a product layer and an excess agent layer, a means to permit excess agent to flow out of the settling tank and means to permit said product to flow out of the settling tank, an interface control for regulating an interface between the excess agent and the product, a third centrifugal pump, means to flow the product to the third centrifugal pump, means to introduce an aqueous alkaline material into the third centrifugal pump to react with the product to form a salt of a sulfonic acid, a third heat exchanger, means to flow the salt of the sulfonic acid to the third heat exchanger, means to draw off some of the salt and to mix the same with a second aqueous medium to lessen the concentration of the salt to form a diluted aqueous salt mixture, means to measure the hydrogen ion concentration in the diluted aqueous salt mixture, and means responsive to the hydrogen ion concentration to regulate the flow of aqueous alkaline material to the third centrifugal pump for mixing with the product.

2. An apparatus for reacting a first reactant with a second reactant which comprises a first centrifugal pump mixing means for simultaneously and instantaneously mixing the reactants to form a reaction solution, means to introduce a first reactant into the first centrifugal pump mixing means, means to introduce a second reactant into the first centrifugal pump mixing means at substantially the same place in the first centrifugal pump mixing means as said first reactant, a first heat exchanger, means for introducing the reaction solution into the heat exchanger from said first centrifugal pump mixing means, means to split the reaction solution upon leaving the heat exchanger into a first fraction and a second fraction, means for introducing the first fraction into the first centrifugal pump mixing means, a digestion chamber, means to flow the second fraction into the digestion chamber, a second mixing means, means for introducing the second fraction upon leaving the digestion chamber into the second mixing means, means to introduce a first aqueous medium into the second mixing means to form an emulsion, a second heat exchanger, means to flow the emulsion through the second heat exchanger from the second mixing means, a settling tank having an inlet, means to flow the emulsion from the second heat exchanger to the inlet of the settling tank wherein the emulsion separates into a product layer and an excess agent layer, means for flowing off the excess agent layer from the settling tank, interface control means for regulating the interface between the excess agent layer and the product layer, a third mixing means, means to flow the product layer from said settling tank to said third mixing means, means to flow an alkaline material into said third mixing means wherein the two are agitated together to form a salt slurry of high solids concentration, means to flow said salt slurry to a third heat exchanger from said third mixing means, means to bleed off a stream of said salt slurry from the third heat exchanger, means to dilute said salt slurry of said bled-off stream to produce an aqueous salt slurry of reduced solids concentration, means to measure the hydrogen ion concentration of said withdrawn aqueous salt slurry, and means responsive to the measurement of said hydrogen ion concentration to vary the rate of flow of said alkaline material.

3. A reaction apparatus which comprises a first pump wherein the reactants are simultaneously and instantaneously mixed to form a reaction mixture, said first pump having three inlets and an outlet, a first heat exchanger having an inlet and two outlets, said outlet of said first pump being connected to the inlet of said first heat exchanger to transport the reaction mixture thereinto, one of said outlets of the first heat exchanger being connected to one of said inlets of the first pump for recycling a portion of the reaction mixture into the first pump, a digestion chamber having an inlet and an outlet, the second outlet of the first heat exchanger being connected to the inlet of the digestion chamber for carrying the unrecycled portion of the reaction mixture into the digestion chamber, a second pump having two inlets and an outlet, the outlet of the digestion chamber being connected to one of said inlets of the second pump to transport said reaction mixture to the second pump, the other inlet of the second pump being adapted for the introduction of a first aqueous medium into said second pump to form an emulsion in the same, a second heat exchanger having an inlet and an outlet, the outlet of the second pump being connected to the inlet of the second heat exchanger for carrying said emulsion into the second heat exchanger, a settling tank having an inlet, an interface control means and two outlets, the outlet of the second heat exchanger being connected to the inlet of the settling tank for carrying said emulsion to the same, wherein the emulsion rapidly separates into an excess agent layer and a product layer, said interface control means acting to control the interface between the product layer and the excess agent layer, a third pump having at least two inlets and an outlet, one of the outlets of the settling tank being connected to an inlet of the third pump for carrying the product layer to said third pump, means for flowing an alkaline material into another inlet of said third pump wherein the two materials are agitated together to form a salt slurry, a third heat exchanger, means to flow the salt slurry to the third heat exchanger from the outlet of said third pump, means to draw off and sample some of the salt slurry from said third heat exchanger and to mix the same with a second aqueous medium to form a diluted salt slurry, means to measure the hydrogen ion concentration of the diluted salt slurry and a control means responsive to the hydrogen ion concentration of the second aqueous medium to regulate the flow of the alkaline material to said third pump.

4. An apparatus for reacting at least two reactants, comprising a first centrifugal pump, means to introduce a first reactant and a second reactant separately but substantially at the same place in the pump to form a reaction solution, a first heat exchanger, means for flowing the reaction solution from said first centrifugal pump to the first heat exchanger, means to split the reaction solution upon leaving the first heat exchanger into a first solution fraction and a second solution fraction, means to reintroduce the first solution fraction into the first centrifugal pump, a digestion chamber having a relatively small cross-sectional area in proportion to its length, means to flow the second solution fraction into the digestion chamber, a second centrifugal pump, means to introduce the second solution fraction upon leaving the digestion chamber into the second centrifugal pump, means to introduce a first aqueous medium into the second centrifugal pump to form an emulsion out of the second solution fraction and the aqueous medium, a second heat exchanger, means to flow said emulsion through said second heat exchanger, means to split the emulsion upon leaving the second heat exchanger into a first emulsion fraction and a second emulsion fraction, means to reintroduce the first emulsion fraction into the second centrifugal pump, a settling tank, means to flow the second emulsion fraction from the second heat exchanger to the settling tank wherein the emulsion separates into a product layer and an excess agent layer, means to permit the excess agent layer to flow out of the settling tank and means to permit the product layer to flow out of the settling tank, an interface control for regulating an interface between the excess agent layer and the product layer, a third centrifugal pump, means to flow the product layer to the third centrifugal pump, means to introduce a second aqueous medium into the third centrifugal pump to react with the product layer to form a salt, a third heat exchanger, means to flow the salt to the third heat exchanger, means to draw off some of the salt and to mix the same with a third aqueous medium to lessen the concentration of the salt to form a diluted aqueous salt mixture, means to measure the hydrogen ion concentration in the diluted aqueous salt mixture, and means responsive to the hydrogen ion concentration to regulate the flow of the second aqueous medium to the third centrifugal pump for mixing with the product layer.

5. An apparatus for reacting at least two reactants, comprising a first centrifugal pump, means to introduce a first reactant and a second reactant separately but substantially at the same place in the pump to form a reaction solution, a first heat exchanger, means for flowing the reaction solution from the first centrifugal pump to the first heat exchanger, means to split the reaction solution upon leaving the first heat exchanger into a first fraction and second fraction, means to reintroduce the first fraction into the first centrifugal pump, a digestion chamber having a relatively small cross-sectional area in proportion to its length, means to flow the second fraction into the digestion chamber, a second centrifugal pump, means to introduce the second fraction upon leaving the digestion chamber into the second centrifugal pump, means to introduce a first aqueous medium into the second centrifugal pump to form an emulsion out of the second fraction and the aqueous medium, a second heat exchanger, means to flow said emulsion through said second heat exchanger, a settling tank, means to flow the emulsion from the second heat exchanger into the settling tank wherein the emulsion separates into a product layer and an excess agent layer, means comprising a valve to permit the excess agent layer to flow out of the settling tank and means to permit the product layer to flow out of the settling tank, an interface control for regulating an interface between the excess agent layer and the product layer, means to permit a portion of the excess agent layer flowing out of the settling tank to return to the second centrifugal pump to aid in the formation of the emulsion, means responsive to the interface control for opening and closing the valve to control the flow of the excess agent layer, a third centrifugal pump, means to flow the product layer to the third centrifugal pump, means to introduce a second aqueous medium into the third centrifugal pump to react with the product layer to form a salt, a third heat exchanger, means to flow the salt to the third heat exchanger, means to draw off some of the salt and to mix the same with a third aqueous medium to lessen the concentration of the salt to form a diluted aqueous salt mixture, means to measure the hydrogen ion concentration in the diluted aqueous salt mixture, and means responsive to the hydrogen ion concentration to regulate the flow of the second aqueous medium to the third centrifugal pump for mixing with the product layer.

6. An apparatus for reacting at least two reactants, comprising a first centrifugal pump, means to introduce a first reactant and a second reactant separately but substantially at the same place in the pump to form a reaction solution, a first heat exchanger, means for flowing the reaction solution to the first heat exchanger, means to split the reaction solution upon leaving the first heat exchanger into a first fraction and a second fraction, means to reintroduce the first fraction into the first centrifugal pump, a digestion chamber having a relatively small cross-sectional area in proportion to its length, means to flow the second fraction into the digestion chamber, a second centrifugal pump, means to introduce the second fraction upon leaving the digestion chamber into the second centrifugal pump, means to introduce a first aqueous medium into the second centrifugal pump to form an emulsion out of the second fraction and the aqueous medium, a second heat exchanger, means to flow said emulsion from said second centrifugal pump through said second heat exchanger, a settling tank, means to flow the emulsion from the second heat exchanger to the settling tank wherein the emulsion separates into a product layer and an excess agent layer, means to permit the excess agent layer to flow out of the settling tank and means to permit the product layer to flow out of the settling tank, an interface control for regulating an interface between the excess agent layer and the product layer, a third centrifugal pump, means to flow the product layer to the third centrifugal pump, means to introduce a second aqueous medium into the third centrifugal pump to react with the product layer to form a salt slurry, a third heat exchanger, means to flow the salt slurry to the third heat exchanger, means to draw off some of the salt slurry before the third heat exchanger and to mix the same with a third aqueous medium to lessen the concentration of the salt slurry to form a diluted aqueous salt slurry, means to measure the hydrogen ion concentration in the diluted aqueous salt slurry, means responsive to the hydrogen ion concentration to regulate the flow of the second aqueous medium to the third centrifugal pump for mixing with the product layer, means to split the salt slurry upon leaving the third heat exchanger into a first salt slurry fraction and a second salt slurry fraction, means to reintroduce the first salt slurry fraction into the third centrifugal pump, and means to withdraw the second salt slurry fraction.

7. An apparatus for reacting at least two reactants in accordance with claim 6, including means to return the diluted aqueous salt slurry from the hydrogen ion concentration measuring means to the salt slurry leaving the third heat exchanger.

References Cited in the file of this patent

UNITED STATES PATENTS

| | | |
|---|---|---|
| 2,063,140 | Allison | Dec. 8, 1936 |
| 2,260,834 | Everett | Oct. 28, 1941 |
| 2,332,527 | Pyzel | Oct. 26, 1943 |
| 2,350,095 | Carlson et al. | May 30, 1944 |
| 2,729,549 | Reman et al. | Jan. 3, 1956 |
| 2,838,378 | Shawhan | June 10, 1958 |
| 2,953,440 | Claudy | Sept. 20, 1960 |

OTHER REFERENCES

Chem. Eng. Handbook, 3rd ed., McGraw-Hill (Perry), p. 1204 (1950).